(12) United States Patent  (10) Patent No.: US 9,014,237 B2
Li et al.  (45) Date of Patent: Apr. 21, 2015

(54) MULTIPLE-IN-MULTIPLE-OUT NETWORK-CODED AMPLIFY-AND-FORWARD RELAYING SCHEME FOR THREE NODE BIDIRECTIONAL COOPERATION

(75) Inventors: Jialing Li, Melville, NY (US); Wen Gao, West Windsor, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/810,408

(22) PCT Filed: Jul. 29, 2010

(86) PCT No.: PCT/US2010/043655
§ 371 (c)(1),
(2), (4) Date: Jan. 15, 2013

(87) PCT Pub. No.: WO2012/015409
PCT Pub. Date: Feb. 2, 2012

(65) Prior Publication Data
US 2013/0114650 A1 May 9, 2013

(51) Int. Cl.
*H04B 3/36* (2006.01)
*H04B 7/04* (2006.01)
(Continued)

(52) U.S. Cl.
CPC .............. *H04B 7/0456* (2013.01); *H04B 7/022* (2013.01); *H04B 7/026* (2013.01); *H04B 7/0413* (2013.01);
(Continued)

(58) Field of Classification Search
CPC ...... H04B 7/022; H04B 7/026; H04B 7/0413; H04B 7/0456; H04B 7/0465; H04B 7/0617; H04B 7/0665; H04B 7/155; H04B 7/15521; H04B 7/2606; H04B 7/2656; H04B 7/061; H04L 1/0001; H04L 1/0025; H04L 1/0077; H04L 1/0026; H04L 25/03898; H04L 1/06; H04L 27/2636; H04L 5/0023; H04L 5/0048; H04L 1/0009; H04L 25/03949; H04L 5/001; H04L 5/0035; H04L 5/0051; H04L 5/0053; H04L 1/0003; H04L 1/0015
USPC ......... 375/211, 213–215, 219, 223, 229, 259, 375/260, 267, 281, 295, 316, 322, 346, 350
See application file for complete search history.

(56) References Cited

U.S. PATENT DOCUMENTS 8,315,326 B2 * 11/2012 Agee et al. ..................... 375/267
8,542,760 B2 * 9/2013 Zhang et al. ................... 375/262
(Continued)

FOREIGN PATENT DOCUMENTS

CN 101128997 2/2008
CN 101483622 7/2009
(Continued)

*Primary Examiner* — Hirdepal Singh
(74) *Attorney, Agent, or Firm* — Robert D. Shedd; Jeffrey M. Navon; Catherine A. Cooper

(57) ABSTRACT

A method and apparatus are described including receiving a first signal including first data in a first time slot of a first channel (705), receiving a second signal including second data in a second time slot of a second channel (710), determining a first pre-coding matrix (715), determining a second pre-coding matrix (720), applying the first pre-coding matrix to the first data to produce pre-coded first data (725), applying the second pre-coding matrix to the second data to produce pre-coded second data (730), generating a third signal by combining the pre-coded first data and the pre-coded second data (735) and transmitting the third signal on the first channel and on the second channel (740). Also described are a method and apparatus including transmitting a first signal (605), receiving a second signal including a first training sequence (610) and decoding the second signal by removing the first training sequence and removing the first signal (615).

24 Claims, 10 Drawing Sheets

(51) Int. Cl.
  *H04B 7/02*   (2006.01)
  *H04B 7/06*   (2006.01)
  *H04B 7/155*  (2006.01)
  *H04B 7/26*   (2006.01)

(52) U.S. Cl.
  CPC .............. *H04B 7/0665* (2013.01); *H04B 7/155* (2013.01); *H04B 7/0617* (2013.01); *H04B 7/2656* (2013.01); *H04B 7/0465* (2013.01)

(56) References Cited

U.S. PATENT DOCUMENTS

| | | | |
|---|---|---|---|
| 2007/0086512 A1* | 4/2007 | Can et al. .................... | 375/148 |
| 2007/0149117 A1 | 6/2007 | Hwang et al. | |
| 2008/0219251 A1 | 9/2008 | Xue | |
| 2009/0190634 A1 | 7/2009 | Bauch et al. | |
| 2009/0268662 A1* | 10/2009 | Larsson et al. ............... | 370/328 |
| 2009/0268790 A1 | 10/2009 | Josiam et al. | |
| 2009/0270028 A1* | 10/2009 | Khojastepour et al. ........ | 455/24 |
| 2010/0136903 A1* | 6/2010 | Lee et al. ..................... | 455/17 |
| 2010/0173659 A1 | 7/2010 | Shin et al. | |
| 2010/0203826 A1* | 8/2010 | Xue et al. ..................... | 455/9 |
| 2010/0278169 A1* | 11/2010 | Wang et al. ................... | 370/345 |
| 2011/0002406 A1* | 1/2011 | Ming et al. ................... | 375/260 |
| 2011/0110284 A1* | 5/2011 | Wu et al. ...................... | 370/312 |
| 2011/0149835 A1* | 6/2011 | Shimada et al. .............. | 370/315 |
| 2011/0249558 A1* | 10/2011 | Raaf et al. .................... | 370/237 |
| 2011/0294415 A1* | 12/2011 | Jeon et al. ..................... | 455/7 |
| 2012/0093061 A1* | 4/2012 | Charbit et al. ................ | 370/315 |
| 2012/0106373 A1* | 5/2012 | Gaal et al. .................... | 370/252 |
| 2012/0207084 A1* | 8/2012 | Seo et al. ...................... | 370/315 |
| 2012/0320819 A1* | 12/2012 | Kim et al. ..................... | 370/315 |
| 2012/0327801 A1* | 12/2012 | Seo et al. ...................... | 370/252 |
| 2013/0077555 A1* | 3/2013 | Gao et al. ..................... | 370/312 |

FOREIGN PATENT DOCUMENTS

| | | | | |
|---|---|---|---|---|
| CN | 101611598 | 12/2009 | | |
| EP | 2207274 | 7/2010 | | |
| EP | 2413517 | 2/2012 | | |
| JP | 2009171576 | 7/2009 | | |
| JP | 2010252292 | 11/2010 | | |
| WO | WO2009026695 | 5/2009 | | |
| WO | WO 2009107314 A1 * | 9/2009 | ............... | H04B 7/04 |

* cited by examiner

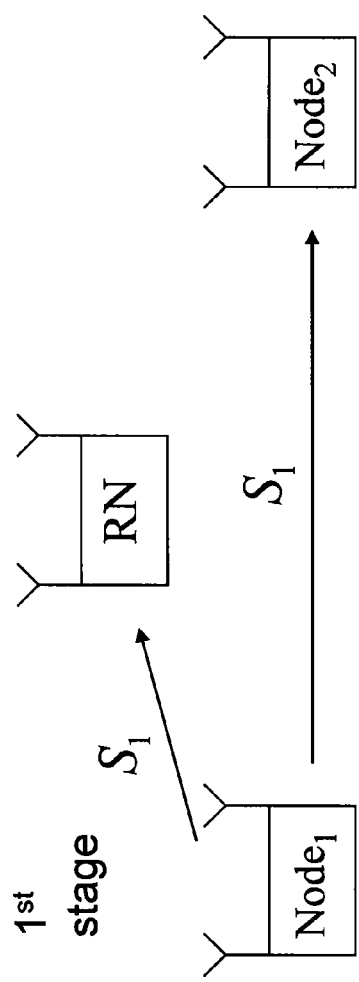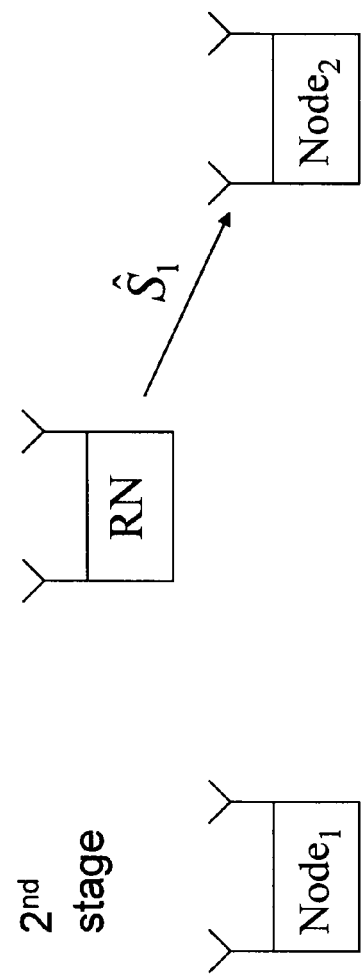

Fig. 2
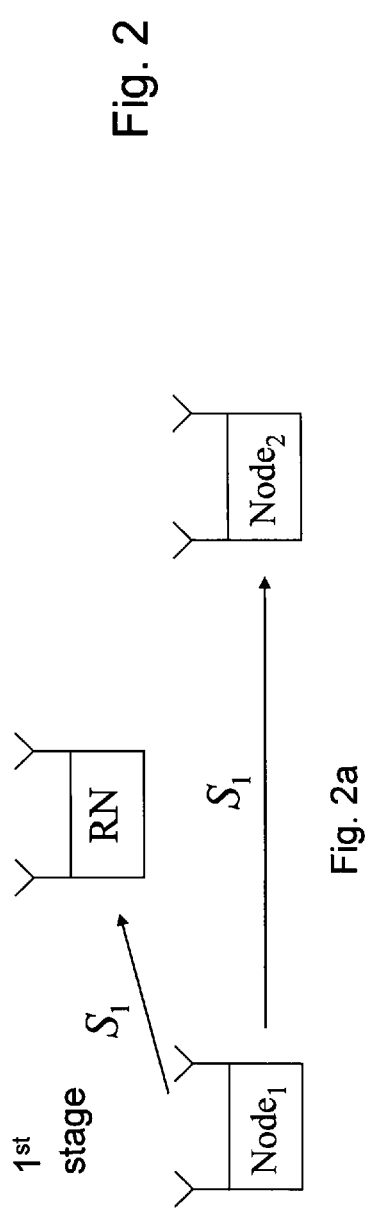
1st stage
Fig. 2a
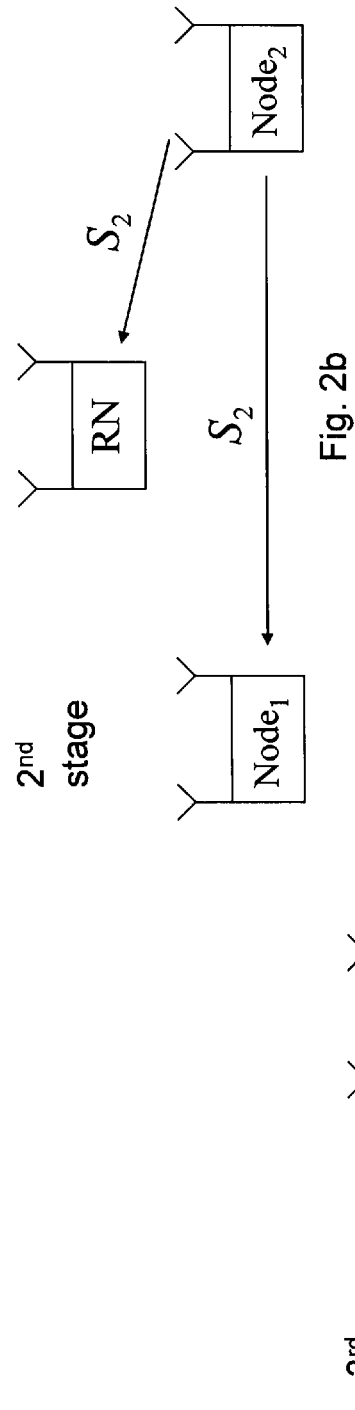
2nd stage
Fig. 2b
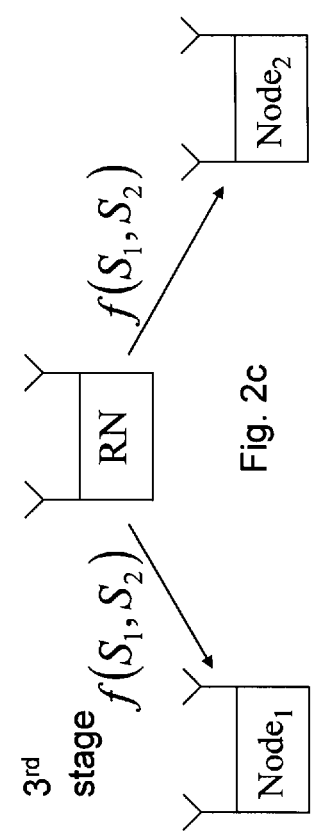
3rd stage
Fig. 2c

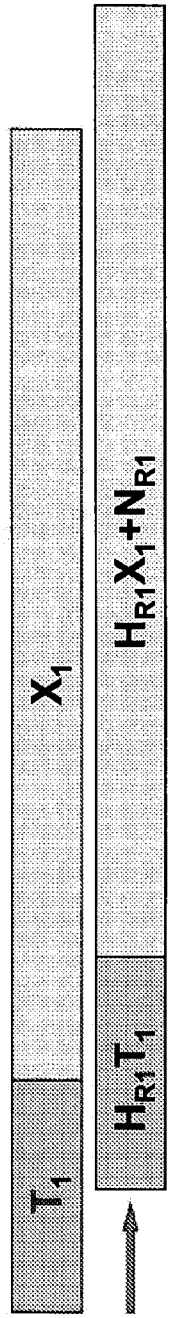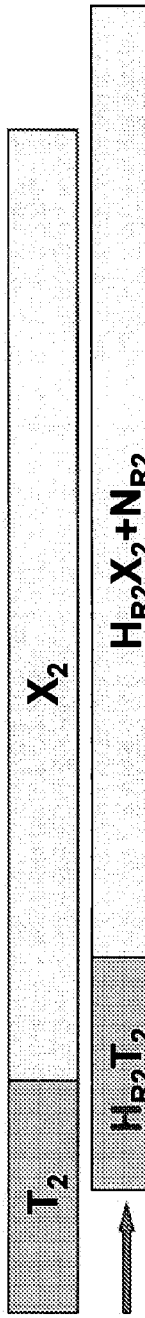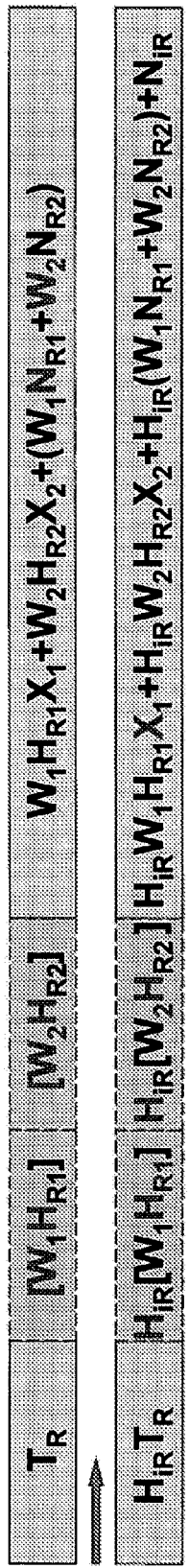
Fig. 4b

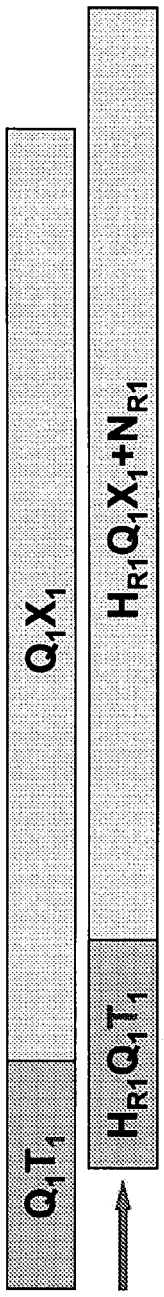
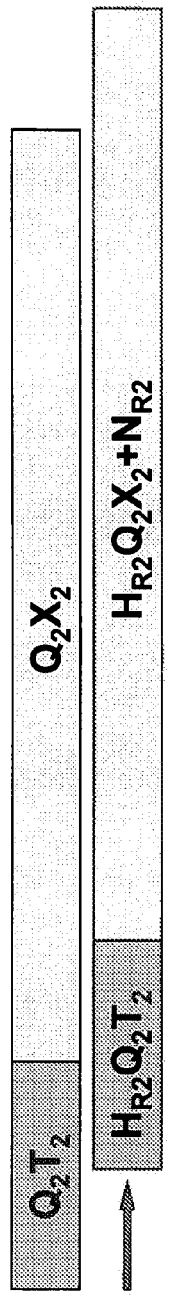
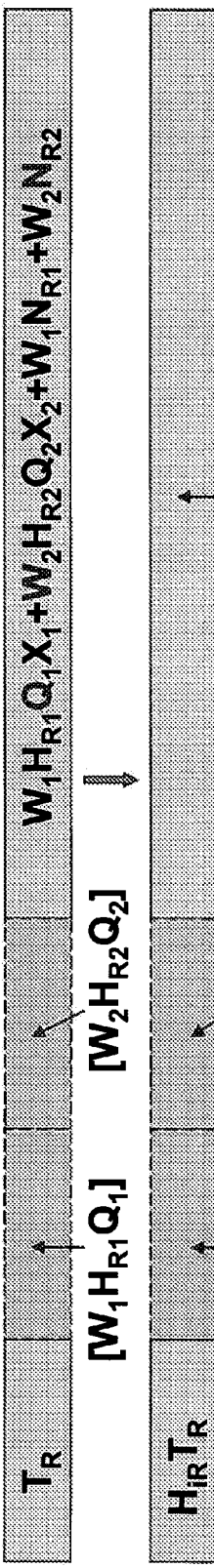
Fig. 5b

MULTIPLE-IN-MULTIPLE-OUT NETWORK-CODED AMPLIFY-AND-FORWARD RELAYING SCHEME FOR THREE NODE BIDIRECTIONAL COOPERATION

This application claims the benefit, under 35 U.S.C. §365 of International Application PCT/US10/43655, filed Jul. 29, 2010, which was published in accordance with PCT Article 21(2) on Feb. 2, 2012 in English.

FIELD OF THE INVENTION

The present invention is directed to a three node cooperation scheme to assist in bidirectional transmissions (communications) of the draft IEEE 802.11n standard.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

Consider multicast (downlink) and multi-access (uplink) channels with one access point (AP) and several nodes. In the IEEE 802.11n draft standard, a reverse direction (RD) protocol is introduced for fast scheduling of bidirectional traffic flows within a transmission opportunity (TXOP). The reverse direction protocol permits (allows) the node, which has obtained the TXOP to grant reverse directional transmissions to another node while it is still in control of the TXOP. If the channel conditions between the nodes are inadequate (poor) then transmissions between the two nodes suffer. That suffering may be reduced data rate and/or throughput.

In the IEEE 802.11n draft standard, a reverse direction (RD) protocol has been proposed as in FIG. 1. The reverse direction protocol of the IEEE 802.11n draft standard only schedules bidirectional transmission between two nodes. Each node is both a source node and a destination node. There is no existing scheduling protocol for three-node bidirectional transmissions in IEEE 802.11 WLAN standards. FIG. 1 illustrates the conventional unidirectional cooperation using a half-duplex relay node (RN). FIG. 1a shows the first stage of communication, in which $Node_1$ transmits (sends, communicate) data $S_1$ to both $Node_2$ and the RN. FIG. 1b shows stage 2 of communication, in which the RN transmits (communicates, sends) data $\hat{S}_1$ to $Node_2$. That is, the RN transmits (communicates, forwards, sends) data $S_1$ as $\hat{S}_1$ to $Node_2$. Correspondingly (and not shown), in the third stage of communication, $Node_2$ transmits (sends, communicate) data $S_2$ to both $Node_1$ and the RN. In the fourth stage of communication, the RN transmits (communicates, forwards, sends) data $\hat{S}_2$ to $Node_1$. That is, the RN transmits (communicates, forwards, sends) data $S_2$ as $\hat{S}_2$ to $Node_1$. Thus, in the conventional approach, there are four stages (phases) to complete communications using the half-duplex RN to assist $Node_1$ and $Node_2$.

Network-coded three-node bidirectional cooperation with three stages (i.e., the reception of signals from nodes (source and destination) at the RN are orthogonal (separate)) has been studied, using Decode-and-Forward, Soft Decode-and-Forward, and Amplify-and-Forward in a single-antenna system, and a case when $L_1=L_2=1$ and $L_R=2$ etc, respectively. Note that $L_i$, i=1, 2,R represents the number of antennas at $Node_1$, $Node_2$ and RN respectively. The present invention uses Amplify-and-Forward for the general MIMO case with an arbitrary number of antennas at the nodes. This has not been addressed in any publications known to the Applicants.

SUMMARY OF THE INVENTION

As used herein a node includes (but is not limited to) a station (STA), a mobile device, a mobile terminal, a dual mode smart phone, a computer, a laptop computer or any other equivalent device capable of operating under the IEEE 802.11n draft standard.

Consider multicast (downlink) and multi-access (uplink) channels with one access point (AP) and several nodes. In the IEEE 802.11n draft standard, a reverse direction (RD) protocol is introduced for fast scheduling of bidirectional traffic flows within a transmission opportunity (TXOP). The reverse direction protocol permits (allows) the node, which has obtained the TXOP to grant reverse directional transmissions to another node while it is still in control of the TXOP. However, when the channel state (channel conditions) between the two nodes is not sufficient for providing fast and reliable transmissions (communication) between them, cooperation through a third node, a half-duplex relay node (RN), may be involved to assist transmissions (communications). When the transmission between these two nodes involves cooperation through a third node, a half-duplex relay node (RN), the situation becomes more complicated, and wireless network coding can be utilized to further increase system throughput. Each node is both a source node and a destination node.

In the present invention, as shown in FIG. 2 and described more fully below, wireless network coding is introduced into the system and combined with bidirectional cooperation to increase system throughput. The present invention describes a network-coded amplify-and-forward (NCAF) relaying scheme in such a three-node bidirectional cooperation scenario.

In three-node bidirectional cooperation scheme of the present invention, two nodes, $Node_1$ and $Node_2$, are both source and destination nodes, and the RN is a relay node, assisting the bidirectional transmission between $Node_1$ and $Node_2$. The relay node (RN) sequentially receives signals from both $Node_1$ and $Node_2$, combines the two signals with pre-coding matrices for both of them, and broadcasts the mixed signal to both nodes on orthogonal channels. Each of the nodes (source and destination) receives both the transmission (communication) of the desired signal from the other node, and the transmission (communication) of the mixed signal from the RN. Each node can jointly decode the data it desires based on the knowledge of the signal it sent out (transmitted, communicated). The process is shown in FIG. 3, which will be further described below. The present invention not only describes the above network-coded amplify-and-forward (NCAF) relaying scheme, but also solves the design problem of the pre-coding matrices at RN for the received signals from the nodes (source and destination), so as to maximize the instantaneous capacity of the bidirectional cooperation system, subject to a total power constraint at the RN, given channel state information (CSI) in two cases:

(1) Without CSI of direct links at the RN: Only CSI of the channels from the nodes (source and destination) to the RN, and the channels from the RN to the nodes (source and destination), are known at the RN. CSI of the channels between the two nodes (source and destination) is not known at the RN.

(2) With CSI of the direct links at the RN: CSI of the channels from the nodes (source and destination) to the RN, and the channels from RN to the nodes (source and destination), and the channels between the two nodes (source and destination) are known at the RN.

In the Network-Coded Amplify-and-Forward (NCAF) relaying scheme of the present invention, the RN no longer forwards the amplified received signals from one node to another as in conventional amplify-and-forward cooperation. Instead, the RN combines two received signals from two nodes by firstly multiplying them with pre-coding matrices. Then the RN broadcasts (multicasts) the combined signal, which contains the mixed data of the bidirectional traffic flow. Each end node receives the signal from the RN. The nodes can then jointly decode its desired signal based on the knowledge of the signal it has sent out (transmitted, communicated). There is still diversity in the cooperation.

The NCAF relaying scheme of the present invention, may prove to be essential to the future the IEEE 802.11 draft Very High Throughput (VHT) standard. The advantage of the NCAF relaying scheme of the present invention is that only simple processing, i.e., linear pre-coding, is needed at the relay node (RN). It is also compatible with conventional cooperation using an amplify-and-forward relaying scheme. The NCAF relaying scheme of the present invention also solves the problem when the RN is not able to decode the received data due to an insufficient number of antennas equipped at the RN and is always feasible for any multiple-antenna systems.

A method and apparatus are described including receiving a first signal including first data in a first time slot of a first channel, receiving a second signal including second data in a second time slot of a second channel, determining a first pre-coding matrix, determining a second pre-coding matrix, applying the first pre-coding matrix to the first data to produce pre-coded first data, applying the second pre-coding matrix to the second data to produce second pre-coded data, generating a third signal by combining the pre-coded first data and the pre-coded second data and transmitting the third signal on the first channel and on the second channel. Also described are a method and apparatus including transmitting a first signal, receiving a second signal and jointly decoding the second signal including a first training sequence by removing the first training sequence and removing the first signal.

BRIEF DESCRIPTION OF THE DRAWINGS

The present invention is best understood from the following detailed description when read in conjunction with the accompanying drawings. The drawings include the following figures briefly described below:

FIG. 1 shows the amplify-and-forward relaying scheme.

FIG. 2 shows the operation of the Network-Coded Amplify-and-Forward relaying scheme for bidirectional cooperation of the present invention using a half-duplex relay node.

DETAILED DESCRIPTION OF THE PREFERRED EMBODIMENTS

Figure 3A:
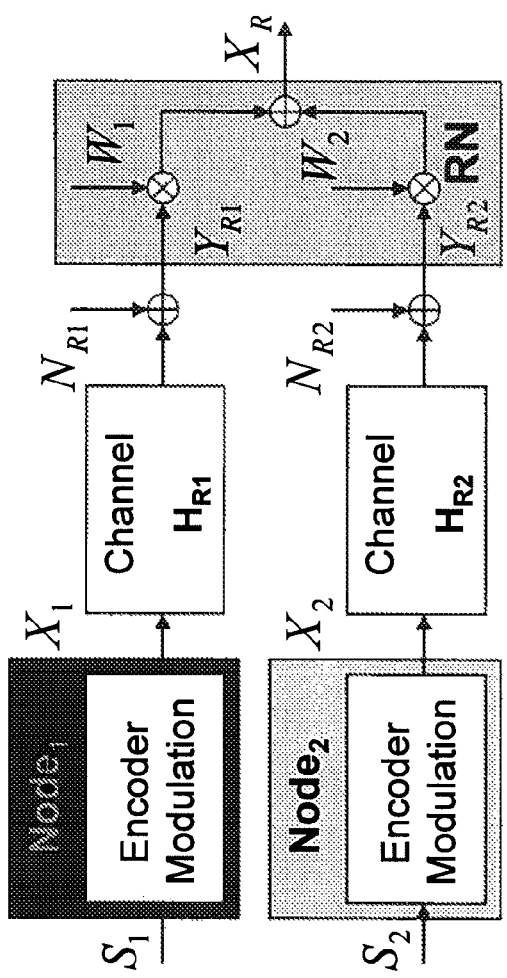
FIG. 3a is a block diagram of the operation of an exemplary embodiment of the transmission side of the Network-Coded Amplify-and-Forward relaying scheme of the present invention.

FIG. 2 shows the operation of the Network-Coded Amplify-and-Forward relaying scheme for bidirectional cooperation of the present invention using a half-duplex relay node. FIG. 2a shows the first stage of communication, in which Node$_1$ transmits (sends, communicates) data S$_1$ to both Node$_2$ and the RN. In the second stage of communication as shown in FIG. 2b, Node$_2$ transmits (sends, communicate) data S$_2$ to both Node$_1$ and the RN. In the third stage of communication as shown in FIG. 2c, the RN combines (mixes) data $\hat{S}_1 + \hat{S}_2$ for transmission (communication) to both Node$_1$ and Node$_2$. Data $\hat{S}_1 + \hat{S}_2$ is formed by applying pre-coding matrices to data S$_1$ and data S$_2$. The combination of data $\hat{S}_1 + \hat{S}_2$ is f(S$_1$+S$_2$). The number of stages has thus been reduced from four stages to three stages. It should be noted that in addition to applying pre-coding matrices to the data, beamforming matrices may also be applied to the data.

A system model and some notation is introduced first. $X_i$ is the signal transmitted from Node$_i$, (i=1, 2, R, and Node$_R$ denotes the RN). $Q_i$ is the beamforming matrix at Node$_i$ and it is an identity matrix if beamforming is not used. $H_{ij}$ is the channel matrix from Node$_j$ to Node$_i$. $Y_{ij}$ and $N_{ij}$ are the received signal and noise from Node$_j$ to Node$_i$, elements are assumed to be independent and identically distributed Gaussian with variance $\sigma_n^2$. $W_i$ is the pre-coding matrix applied to $Y_{Ri}$ at RN. The total transmitted power is $P_i$ at Node$_i$, (i=1, 2) and $P_R$ at the RN.

The RN receives $Y_{R1}=H_{R1}Q_1X_1+N_{R1}$ from Node$_1$ in the 1$^{st}$ time slot, and $Y_{R2}=H_{R2}Q_2X_2+N_{R2}$ from Node$_2$ in the 2$^{nd}$ time slot. Then the RN mixes the weighted received signals as its broadcast signal $$X_R = W_1 Y_{R1} + W_2 Y_{R2} = W_1 H_{R1} Q_1 X_1 + W_2 H_{R2} Q_2 X_2 + W_1 N_{R1} + W_2 N_{R2}.$$

The reception and decoding at one node (source and destination) is used as an example. It goes without saying that demodulation is performed at the reception end. The processing at the other node (source and destination) is similar. Node$_1$ receives $Y_{12}=H_{12}Q_2X_2+N_{12}$ from Node$_2$ in the 2$^{nd}$ time slot, and $Y_{1R}=H_{1R}X_R+N_{1R}$ from the RN in the 3$^{rd}$ time slot, i.e., $Y_{1R}=H_{1R}W_1H_{R1}Q_1X_1+H_{1R}W_2H_{R2}Q_2X_2+H_{1R}W_1N_{R1}+H_{1R}W_2N_{R2}+N_{1R}$. The matrix form is $$\begin{bmatrix} Y_{12} \\ Y_{1R} \end{bmatrix} = \begin{bmatrix} 0_{N_1} \\ H_{1R}W_1H_{R1} \end{bmatrix} Q_1 X_1 + \begin{bmatrix} H_{12} \\ H_{1R}W_2H_{R2} \end{bmatrix} Q_2 X_2 + \quad (1)$$

$$\begin{bmatrix} I_{N_1} & 0_{N_1 \times N_R} & 0_{N_1 \times N_R} & 0_{N_1} \\ 0_{N_1} & H_{1R}W_1 & H_{1R}W_2 & I_{N_1} \end{bmatrix} \begin{bmatrix} N_{12} \\ N_{R1} \\ N_{R2} \\ N_{1R} \end{bmatrix},$$

i.e., $Y_1 = D_1 X_1 + A_1 X_2 + B_1 N_1$, where $Y_1 = [Y_{12}\ Y_{1R}]^T \in C^{2L_1 \times 1}$, $0_{N_i \times N_j} \in C^{L_i \times L_j}$ is a zero matrix, and $I_N \in C^{N \times N}$ is an identity matrix. Note that at $\text{Node}_1$, $X_1$ is known, but $X_2$ is unknown and to be detected. $N_1 = [N_{12}\ N_{R1}\ N_{R2}\ N_{1R}]^T \in C^{2(L_1 + L_R) \times 1}$ is the noise vector at $\text{Node}_1$, and the matrices, $$f = \log\det\left(I_{2N_1} + \frac{P_2}{N_2 \sigma_n^2}(A_1 A_1^H)(B_1 B_1^H)^{-1}\right) + \quad (1)$$

$$\log\det\left(I_{2N_2} + \frac{P_1}{N_1 \sigma_n^2}(A_2 A_2^H)(B_2 B_2^H)^{-1}\right),$$

$$\text{subject to } \frac{P_1}{N_1} tr\{W_1 H_{R1} Q_1 Q_1^H H_{R1}^H W_1^H\} + \sigma_n^2 tr\{W_1 W_1^H\} +$$

$$\frac{P_2}{N_2} tr\{W_2 H_{R2} Q_2 Q_2^H H_{R2}^H W_2^H\} + \sigma_n^2 tr\{W_2 W_2^H\} = P_R,$$

are assumed known. Based on the knowledge of $X_1$, $\text{Node}_1$ can obtain $Z_1 = Y_1 - D_1 X_1 = A_1 X_2 + B_1 N_1$, where $Z_1$ is the equivalent received signal, and $A_1$ is the equivalent channel matrix for signal $X_2$. Then $\text{Node}_1$ can jointly decode $X_2$.

Similarly, $Z_2 = A_2 X_1 + B_2 N_2$, where $Z_2$, $A_2$, $B_2$ and $N_2$ are defined by exchanging the subscripts "1" and "2", and "$N_1$" and "$N_2$" in their counterparts.

The problem is to determine $W_1$ and $W_2$, $W_i \in C^{L_R \times L_R}$, $i=1, 2$, to maximize the instantaneous capacity of the system, subject to the transmit power constraint at the RN. $W_1$ and $W_2$ are the pre-coding matrices. That is, determine $W_1$ and $W_2$, to maximize $$D_1 = \begin{bmatrix} 0_{N_1} \\ H_{1R}W_1H_{R1} \end{bmatrix} Q_1, A_1 = \begin{bmatrix} H_{12} \\ H_{1R}W_2H_{R2} \end{bmatrix} Q_2 \text{ and}$$

$$B_1 = \begin{bmatrix} I_{N_1} & 0_{N_1 \times N_R} & 0_{N_1 \times N_R} & 0_{N_1} \\ 0_{N_1} & H_{1R}W_1 & H_{1R}W_2 & I_{N_1} \end{bmatrix}$$

where $tr(X)$: represents the trace of the matrix X.

Letting $i=1, 2$ be a unitary matrix, the constraint can be simplified to $$\frac{P_1}{N_1} tr\{W_1 H_{R1} H_{R1}^H W_1^H\} + \sigma_n^2 tr\{W_1 W_1^H\} + \quad (2)$$

$$\frac{P_2}{N_2} tr\{W_2 H_{R2} H_{R2}^H W_2^H\} + \sigma_n^2 tr\{W_2 W_2^H\} = P_R.$$

In the first case, the CSI of the channels (links) from $\text{Node}_i$ to the RN and the RN to $\text{Node}_j$, are assumed available at the RN. The CSI of the links (channels) between $\text{Node}_i$, and $\text{Node}_j$, $i, j=1, 2$ and $i \neq j$ is not available. In this scenario, it is necessary to maximize an upper bound of f instead of f itself due to the lack of information in it. That is, determine $W_1$ and $W_2$, to maximize $$f_1 = \log\det\left( \begin{array}{c} I_{N_1} + \frac{P_2}{N_2 \sigma_n^2} H_{1R} W_2 H_{R2} H_{R2}^H W_2^H H_{1R}^H \\ (I_{N_1} + H_{1R} W_1 W_1^H H_{1R}^H + H_{1R} W_2 W_2^H H_{1R}^H)^{-1} \end{array} \right) + \quad (3)$$

$$\log\det\left( \begin{array}{c} I_{N_2} + \frac{P_1}{N_1 \sigma_n^2} H_{2R} W_1 H_{R1} H_{R1}^H W_1^H H_{2R}^H \\ (I_{N_2} + H_{2R} W_1 W_1^H H_{2R}^H + H_{2R} W_2 W_2^H H_{2R}^H)^{-1} \end{array} \right)$$

$$\text{subject to } \frac{P_1}{N_1} tr\{W_1 H_{R1} H_{R1}^H W_1^H\} + \sigma_n^2 tr\{W_1 W_1^H\} +$$

$$\frac{P_2}{N_2} tr\{W_2 H_{R2} H_{R2}^H W_2^H\} + \sigma_n^2 tr\{W_2 W_2^H\} = P_R$$

as shown in Equation (2).

In the second case, the CSI of channels from $\text{Node}_i$ to the RN, from the RN to $\text{Node}_j$, and from $\text{Node}_i$ to $\text{Node}_j$, are assumed to be available to the RN, $i, j=1, 2$ and $i \neq j$. In this scenario, the design problem is to maximize (1) subject to (2).

By the singular value decomposition (SVD) theorem, the channels (links) can be decomposed to $H_{R1} = U_{R1} \Lambda_{R1}^{1/2} V_{R1}^H$, $H_{R2} = U_{R2} \Lambda_{R2}^{1/2} V_{R2}^H$, $H_{1R} = U_{1R} \Lambda_{1R}^{1/2} V_{1R}^H$ and $H_{2R} = U_{2R} \Lambda_{2R}^{1/2} V_{2R}^H$, where $U_{R1}$, $U_{R2}$, $V_{1R}$, $V_{2R} \in C^{L_R \times L_R}$, $V_{R1}$, $U_{1R} \in C^{L_1 \times L_1}$, and $V_{R2}$, $U_{2R} \in C^{L_2 \times L_2}$ are unitary matrices; $\Lambda_{ij}^{1/2} \in C^{L_i \times L_j}$, $i, j=1, 2, R$, are the singular value matrices. In particular, $\Lambda_{ij} = \Lambda_{ij}^{1/2} (\Lambda_{ij}^{1/2})^H = \text{diag}\{\lambda_{ij,k}\} \in C^{L_i \times L_i}$ is, $i, j=1, 2, R$, where $(\bullet)^T$ and $(\bullet)^H$ represent the matrix transpose and conjugate transpose operations, respectively. Also define $T = V_{1R}^H V_{2R} \in C^{L_R \times L_R}$ and denote $T = (t_{ij})$, $i, j=1, \ldots, L_R$.

When the CSI of direct links between $\text{Node}_1$ and $\text{Node}_2$ is not available, let $W_1 = V_{2R} \tilde{W}_1 U_{R1}^H$ and $W_2 = V_{1R} \tilde{W}_2 U_{R2}^H$, where $\tilde{W}_1$, $\tilde{W}_2 \in C^{L_R \times L_R}$ are to be determined. There is no closed form solution. But $\tilde{W}_1$ and $\tilde{W}_2$ can be solved iteratively using Newton's method.

Furthermore, the problem statement can be rewritten in the following form, where the notation will be explained after the approach is introduced.

Determine $\lambda$, to minimize $f_2(\lambda)$ (4)

subject to $\lambda \geq 0$, (5)

$S\lambda = q$. (6)

The Lagrangian function is $L(\lambda, \mu) = f_2(\lambda) - \mu^T(S\lambda - q)$, (7)

where $\mu$ is the vector containing the Lagrangian multipliers. Using Newton's method, the following iterative approach is used to solve for $\lambda$:

Step 1: Initiate $\lambda^0 \in (0, \text{max}\_\lambda)$.
Step 2: In each iteration, solve $$\begin{bmatrix} \nabla^2 f_2(\lambda^k) & -S^T \\ -S & 0 \end{bmatrix} v^k = \begin{bmatrix} S^T \mu^k - \nabla f_2(\lambda^k) \\ S\lambda^k - q \end{bmatrix} \text{ for } v^k = \begin{pmatrix} v_\lambda^k \\ v_\mu^k \end{pmatrix}. \quad (8)$$

Step 3: Take as next iteration $$\begin{pmatrix} \lambda^{k+1} \\ \mu^{k+1} \end{pmatrix} = \begin{pmatrix} \lambda^k \\ \mu^k \end{pmatrix} + \begin{pmatrix} v_\lambda^k \\ v_\mu^k \end{pmatrix}. \quad (9)$$

Step 4: If $\text{sum}(\text{sign}(\lambda^{k+1})) \neq \text{length}(\lambda^{k+1})$ or $\text{sum}(\text{sign}(\text{max}\_\lambda - \lambda^{k+1})) \neq \text{length}(\lambda^{k+1})$, go back to Step 1. Otherwise, go to Step 5.

Step 5: If $\|v_\lambda^k\|^2<$Threshold, stop. Otherwise, k=k+1, and go to Step 2.

In Step 4, given $x=(x_1, \ldots, x_M)^T$ is a column vector or length M, length(x)=M and $$\text{sum}(x) = \sum_{i=1}^{\text{length}(x)} x_i \cdot \text{sign}(x) = \begin{cases} 1, & \text{if } x > 0 \\ 0, & \text{if } x = 0 \\ -1, & \text{if } x < 0 \end{cases},$$

and $\text{sign}(x)=(\text{sign}(x_1), \ldots, \text{sign}(x_M))^T$.

Condition $\alpha_i$ is defined as "when $L_i \geq L_R$, or when both $L_i < L_R$ and $L_i(L_i-1) \geq L_R$ are satisfied", and condition $\beta_i$ is defined as "when both $L_i < L_R$ and $L_i(L_i-1) \leq L_R-1$ are satisfied". Therefore, there are three cases of solution as follows:

General Case 1: When $\alpha_1$ and $\alpha_2$ exist, both $\tilde{W}_1$ and $\tilde{W}_2$ are identity matrices multiplied by constants, respectively, i.e., $\tilde{W}_1 = \lambda_1 I_{L_R}$, $\tilde{W}_2 = \lambda_2 I_{L_R}$, $\lambda_1, \lambda_2 \geq 0$. The notation in the iterative approach is as follows:

$$\lambda = (\lambda_1, \lambda_2)^T, \max\_\lambda = \left(\frac{P_R}{d_a \sigma_n^2}, \frac{P_R}{d_b \sigma_n^2}\right)^T, \mu = \mu \text{ and } v^k = \left(v_{\lambda_1}^k, v_{\lambda_2}^k, v_\mu^k\right)^T.$$

$$S = (d_a, d_b), q = \frac{P_R}{\sigma_n^2}, \text{ where } c_{a,i} = \frac{P_1}{L_1 \sigma_n^2} \lambda_{R1,i} + 1,$$

$$c_{b,i} = \frac{P_2}{L_2 \sigma_n^2} \lambda_{R2,i} + 1, i = 1, \ldots, M, d_a = \sum_{i=1}^{M} c_{a,i}, d_b = \sum_{i=1}^{M} c_{b,i},$$

and $M = \min(L_1, L_2, L_R)$. The Hessian and gradient of $f_2(\lambda)$ are expressed as following:

$$\nabla^2 f_2(\lambda^k) = \begin{pmatrix} \frac{\partial^2 f_2(\lambda^k)}{\partial \lambda_1^2} & \frac{\partial^2 f_2(\lambda^k)}{\partial \lambda_1 \partial \lambda_2} \\ \frac{\partial^2 f_2(\lambda^k)}{\partial \lambda_1 \partial \lambda_2} & \frac{\partial^2 f_2(\lambda^k)}{\partial \lambda_2^2} \end{pmatrix} \text{ and } \nabla f_2(\lambda^k) = \begin{pmatrix} \frac{\partial f_2(\lambda^k)}{\partial \lambda_1} \\ \frac{\partial f_2(\lambda^k)}{\partial \lambda_2} \end{pmatrix},$$

where $\frac{\partial f_2(\lambda)}{\partial \lambda_1} = \sum_{i=1}^{M} (-m_{1,i} + m_{2,i} - c_{a,i} m_{3,i} + m_{4,i})$, $$\frac{\partial f_2(\lambda)}{\partial \lambda_2} = \sum_{i=1}^{M} (-c_{b,i} m_{1,i} + m_{2,i} - m_{3,i} + m_{4,i}),$$

$$\frac{\partial^2 f_2(\lambda)}{\partial \lambda_1^2} = \sum_{i=1}^{M} (m_{1,i}^2 - m_{2,i}^2 + c_{a,i}^2 m_{3,i}^2 - m_{4,i}^2),$$

$$\frac{\partial^2 f_2(\lambda)}{\partial \lambda_1 \partial \lambda_2} = \sum_{i=1}^{M} (c_{b,i} m_{1,i}^2 - m_{2,i}^2 + c_{a,i} m_{3,i}^2 - m_{4,i}^2),$$

$$\frac{\partial^2 f_2(\lambda)}{\partial \lambda_2^2} = \sum_{i=1}^{M} (c_{b,i}^2 m_{1,i}^2 - m_{2,i}^2 + m_{3,i}^2 - m_{4,i}^2),$$

and $m_{1,i} = \frac{\lambda_{1R,i}}{1+\lambda_1 \lambda_{1R,i} + \lambda_2 c_{b,i} \lambda_{1R,i}}$, $m_{2,i} = \frac{\lambda_{1R,i}}{1+\lambda_1 \lambda_{1R,i} + \lambda_2 \lambda_{1R,i}}$, $m_{3,i} = \frac{\lambda_{2R,i}}{1+\lambda_1 c_{a,i} \lambda_{2R,i} + \lambda_2 \lambda_{2R,i}}$, $m_{4,i} = \frac{\lambda_{2R,i}}{1+\lambda_1 \lambda_{2R,i} + \lambda_2 \lambda_{2R,i}}$.

General Case 2: When $\alpha_1$ and $\beta_2$ exist, $\tilde{W}_1$ is an identity matrix multiplied by a constant, i.e., $\tilde{W}_1 = \lambda_1 I_{L_R}$, $\lambda_1 \geq 0$; while $\tilde{W}_2 = \Lambda_2^{1/2} = \text{diag}\{\lambda_{2,1}^{1/2}, \ldots, \lambda_{2,L_R}^{1/2}\}$, $\lambda_{2,i} \geq 0, i=1, \ldots, L_R$, is a diagonal matrix. The notation in the iterative approach is as follows:

$$\lambda = (\lambda_1, \lambda_{2,1}, \ldots, \lambda_{2,L_R})^T, \max\_\lambda = \left(\frac{P_R}{d_a \sigma_n^2}, \frac{P_R}{c_{b,1} \sigma_n^2}, L, \frac{P_R}{c_{b,M} \sigma_n^2}, 1_{L_R-M}^T\right)^T,$$

$$\mu = (\mu_1, L, \mu_{L_2(L_2-1)+1})^T, v^k = \left(v_{\lambda_1}^k, v_{\lambda_{2,1}}^k, L, v_{\lambda_{2,L_R}}^k, v_{\mu_1}^k, L, v_{\mu_{L_2(L_2-1)+1}}^k\right)^T,$$

$$1_N = \underbrace{(1, \ldots, 1)}_{N}. \ S = \begin{bmatrix} 0_{L_2(L_2-1)\times 1} & S_2 \\ d_a & c_{b,1}, L, c_{b,M}, 0_{1\times(L_R-M)} \end{bmatrix},$$

$$q = \begin{pmatrix} 0_{L_2(L_2-1)\times 1} \\ \frac{P_R}{\sigma_n^2} \end{pmatrix}, \text{ where } c_{a,i} = \frac{P_1}{L_1 \sigma_n^2} \lambda_{R1,i} + 1, c_{b,i} = \frac{P_2}{L_2 \sigma_n^2} \lambda_{R2,i} + 1,$$

$$i = 1, L, M, d_a = \sum_{i=1}^{M} c_{a,i}, \text{ and } M = \min(L_1, L_2, L_R).$$

And $$S_2 = \begin{bmatrix} \text{Re}\{s_2\} \\ \text{Im}\{s_2\} \end{bmatrix} \in R^{L_2(L_2-1)\times L_R},$$

where $\text{Re}\{\cdot\}$ and $\text{Im}\{\cdot\}$ are the functions which take the real and imaginary parts of the variables, and $s_2$ comes from the linear equations $$\sum_{k=1}^{L_R} \lambda_{2,k} t_{ki}^* t_{kj} = 0, 1 \leq i < j \leq L_2, \text{ i.e.,}$$

$$s_2 = \begin{pmatrix} t_{11}^* t_{12} & t_{21}^* t_{22} & L & t_{L_R,1}^* t_{L_R,2} \\ t_{11}^* t_{13} & t_{21}^* t_{23} & L & t_{L_R,1}^* t_{L_R,3} \\ M & M & O & M \\ t_{11}^* t_{1,L_2} & t_{21}^* t_{2,L_2} & L & t_{L_R,1}^* t_{L_R,L_2} \\ t_{12}^* t_{13} & t_{22}^* t_{23} & L & t_{L_R,2}^* t_{L_R,3} \\ M & M & O & M \\ t_{12}^* t_{1,L_2} & t_{22}^* t_{2,L_2} & L & t_{L_R,2}^* t_{L_R,L_2} \\ M & M & O & M \\ t_{1,L_2-1}^* t_{1,L_2} & t_{2,L_2-1}^* t_{2,L_2} & L & t_{L_R,L_2-1}^* t_{L_R,L_2} \end{pmatrix} \in$$

$$C^{\frac{L_2(L_2-1)}{2}\times L_R}. \ \nabla^2 f_2(\lambda^k) =$$

$$\begin{pmatrix} \frac{\partial^2 f_2(\lambda^k)}{\partial \lambda_1^2} & \frac{\partial^2 f_2(\lambda^k)}{\partial \lambda_1 \partial \lambda_{2,1}} & L & \frac{\partial^2 f_2(\lambda^k)}{\partial \lambda_1 \partial \lambda_{2,L_R}} \\ \frac{\partial^2 f_2(\lambda^k)}{\partial \lambda_1 \partial \lambda_{2,1}} & \frac{\partial^2 f_2(\lambda^k)}{\partial \lambda_{2,1}^2} & L & \frac{\partial^2 f_2(\lambda^k)}{\partial \lambda_{2,1} \partial \lambda_{2,L_R}} \\ M & M & O & M \\ \frac{\partial^2 f_2(\lambda^k)}{\partial \lambda_1 \partial \lambda_{2,L_R}} & \frac{\partial^2 f_2(\lambda^k)}{\partial \lambda_{2,1} \partial \lambda_{2,L_R}} & L & \frac{\partial^2 f_2(\lambda^k)}{\partial \lambda_{2,L_R}^2} \end{pmatrix} \text{ and,}$$

where $\frac{\partial f_2(\lambda)}{\partial \lambda_1} = \sum_{i=1}^{M} (-m_{1,i} + m_{2,i} - c_{a,i} m_{3,i} + m_{4,i})$, $$\frac{\partial f_2(\lambda)}{\partial \lambda_{2,j}} = \begin{cases} -c_{b,j} m_{1,j} + m_{2,j} + \sum_{i=1}^{M} |t_{ji}|^2 (-m_{3,i} + m_{4,i}), & 1 \leq j \leq M \\ \sum_{i=1}^{M} |t_{ji}|^2 (-m_{3,i} + m_{4,i}), & M+1 \leq j \leq L_R \end{cases},$$

-continued $$\frac{\partial^2 f_2(\lambda)}{\partial \lambda_1^2} = \sum_{i=1}^{M} (m_{1,i}^2 - m_{2,i}^2 + c_{a,i}^2 m_{3,i}^2 - m_{4,i}^2),$$

$$\frac{\partial^2 f_2(\lambda)}{\partial \lambda_1 \partial \lambda_{2,j}} = \begin{cases} c_{b,j} m_{1,j}^2 - m_{2,j}^2 + \sum_{i=1}^{M} |t_{ji}|^2 (c_{a,i} m_{3,i}^2 - m_{4,i}^2), & 1 \le j \le M \\ \sum_{i=1}^{M} |t_{ji}|^2 (c_{a,i} m_{3,i}^2 - m_{4,i}^2), & M+1 \le j \le L_R \end{cases},$$

$$\frac{\partial^2 f_2(\lambda)}{\partial \lambda_{2,j}^2} = \begin{cases} c_{b,j}^2 m_{1,j}^2 - m_{2,j}^2 + \sum_{i=1}^{M} |t_{ji}|^4 (m_{3,i}^2 - m_{4,i}^2), & 1 \le j \le M \\ \sum_{i=1}^{M} |t_{ji}|^4 (m_{3,i}^2 - m_{4,i}^2), & M+1 \le j \le L_R \end{cases},$$

$$\frac{\partial^2 f_2(\lambda)}{\partial \lambda_{2,j} \partial \lambda_{2,l}} = \sum_{i=1}^{M} |t_{ji}|^2 |t_{li}|^2 (m_{3,i}^2 - m_{4,i}^2), \ 1 \le j, l \le L_R, \ j \ne l,$$

$$m_{1,i} = \frac{\lambda_{1R,i}}{1 + \lambda_1 \lambda_{1R,i} + \lambda_2 c_{b,i} \lambda_{1R,i}}, \ m_{2,i} = \frac{\lambda_{1R,i}}{1 + \lambda_1 \lambda_{1R,i} + \lambda_2 \lambda_{1R,i}},$$

$$m_{3,i} = \frac{\lambda_{2R,i}}{1 + \lambda_1 c_{a,i} \lambda_{2R,i} + \sum_{k=1}^{L_R} \lambda_{2,k} |t_{ki}|^2 \lambda_{2R,i}},$$

$$m_{4,i} = \frac{\lambda_{2R,i}}{1 + \lambda_1 \lambda_{2R,i} + \sum_{k=1}^{L_R} \lambda_{2,k} |t_{ki}|^2 \lambda_{2R,i}}.$$

General Case 3: When $\beta_1$ and $\beta_2$ exist, both $W_1^{\%} = \Lambda_1^{1/2} = \text{diag}\{\lambda_{1,1}^{1/2}, L, \lambda_{1,L_R}^{1/2}\}$, $\lambda_{1,i} \ge 0, i=1, L, L_R$, and $W_2^{\%} = \Lambda_2^{1/2} = \text{diag}\{\lambda_{2,1}^{1/2}, L, \lambda_{2,L_R}^{1/2}\}$, $\lambda_{2,i} \ge 0, i=1, L, L_R$, are diagonal matrices. The notation in the iterative approach is as follows:

$$\lambda = (\lambda_{1,1}, L\lambda_{1,N_R}, \lambda_{2,1}, L\lambda_{2,L_R})^T, \ \mu = (\mu_1, L, \mu_{L_2(L_2-1)+1})^T,$$

$$\max\_\lambda = \left(\frac{P_R}{c_{a,1}\sigma_n^2}, L, \frac{P_R}{c_{a,M}\sigma_n^2}, 1_{L_R-M}^T, \frac{P_R}{c_{b,1}\sigma_n^2}, L, \frac{P_R}{c_{b,M}\sigma_n^2}, 1_{L_R-M}^T\right)^T,$$

$$1_N = (1, \underset{N}{\ldots}, 1),$$

and $v^k = \left(v_{\lambda_{1,1}}^k, L, v_{\lambda_{1,L_R}}^k, v_{\lambda_{2,1}}^k, L, v_{\lambda_{2,L_R}}^k, v_{\mu_1}^k, L, v_{\mu_{L_2(L_2-1)+1}}^k\right)^T$. $S =$ $$\begin{bmatrix} S_1 & 0_{L_1(L_1-1)\times 1} \\ 0_{L_2(L_2-1)\times 1} & S_2 \\ c_{a,1}, L, c_{a,M}, 0_{1\times(L_R-M)} & c_{b,1}, L, c_{b,M}, 0_{1\times(L_R-M)} \end{bmatrix},$$

$$q = \begin{pmatrix} 0_{[L_1(L_1-1)+L_2(L_2-1)]\times 1} \\ \frac{P_R}{\sigma_n^2} \end{pmatrix}, \text{ where } c_{a,i} = \frac{P_1}{L_1\sigma_n^2}\lambda_{R1,i} + 1,$$

$$c_{b,i} = \frac{P_2}{L_2\sigma_n^2}\lambda_{R2,i} + 1, \ i=1, L, M, \text{ and } M = \min(L_1, L_2, L_R).$$

And $$S_1 = \begin{bmatrix} \text{Re}\{s_1\} \\ \text{Im}\{s_1\} \end{bmatrix} \in R^{L_1(L_1-1)\times L_R} \text{ and } S_2 = \begin{bmatrix} \text{Re}\{s_2\} \\ \text{Im}\{s_2\} \end{bmatrix} \in R^{L_2(L_2-1)\times L_R},$$

where $\text{Re}\{\cdot\}$ and $\text{Im}\{\cdot\}$ are the functions which take the real and imaginary part of the variables, $s_1$ and $s_2$ come from the linear equations $$\sum_{k=1}^{L_R} \lambda_{1,k} t_{ik} t_{jk}^* = 0, \ 1 \le i < j \le L_1, \text{ and}$$

$$\sum_{k=1}^{L_R} \lambda_{2,k} t_{ki}^* t_{kj} = 0, \ 1 \le i < j \le L_2,$$

respectively, i.e., $$s_1 = \begin{pmatrix} t_{11}t_{21}^* & t_{12}t_{22}^* & L & t_{1,L_R}t_{2,L_R}^* \\ t_{11}t_{31}^* & t_{12}t_{32}^* & L & t_{1,L_R}t_{3,L_R}^* \\ M & M & O & M \\ t_{11}t_{L_1,1}^* & t_{12}t_{L_1,2}^* & L & t_{1,L_R}t_{L_1,L_R}^* \\ t_{21}t_{31}^* & t_{22}t_{32}^* & L & t_{2,L_R}t_{3,L_R}^* \\ M & M & O & M \\ t_{21}t_{L_1,1}^* & t_{22}t_{L_1,2}^* & L & t_{2,L_R}t_{L_1,L_R}^* \\ M & M & O & M \\ t_{L_1-1,1}t_{L_1,1}^* & t_{L_1-1,2}t_{L_1,2}^* & L & t_{L_1-1,L_R}t_{L_1,L_R}^* \end{pmatrix} \in C^{\frac{L_1(L_1-1)}{2}\times L_R},$$

and $s_2 = \begin{pmatrix} t_{11}^* t_{12} & t_{21}^* t_{22} & L & t_{L_R,1}^* t_{L_R,2} \\ t_{11}^* t_{13} & t_{21}^* t_{23} & L & t_{L_R,1}^* t_{L_R,3} \\ M & M & O & M \\ t_{11}^* t_{1,L_2} & t_{21}^* t_{2,L_2} & L & t_{L_R,1}^* t_{L_R,L_2} \\ t_{12}^* t_{13} & t_{22}^* t_{23} & L & t_{L_R,2}^* t_{L_R,3} \\ M & M & O & M \\ t_{12}^* t_{1,L_2} & t_{22}^* t_{2,L_2} & L & t_{L_R,2}^* t_{L_R,N_2} \\ M & M & O & M \\ t_{1,L_2-1}^* t_{1,L_2} & t_{2,L_2-1}^* t_{2,L_2} & L & t_{L_R,L_2-1}^* t_{L_R,L_2} \end{pmatrix} \in C^{\frac{L_2(L_2-1)}{2} \times L_R}$. $\nabla^2 f_2(\lambda^k) =$ $$\begin{pmatrix} \frac{\partial^2 f_2(\lambda^k)}{\partial \lambda_{1,1}^2} & L & \frac{\partial^2 f_2(\lambda^k)}{\partial \lambda_{1,1} \partial \lambda_{1,L_R}} & \frac{\partial^2 f_2(\lambda^k)}{\partial \lambda_{1,1} \partial \lambda_{2,1}} & L & \frac{\partial^2 f_2(\lambda^k)}{\partial \lambda_{1,1} \partial \lambda_{2,L_R}} \\ M & O & M & M & O & M \\ \frac{\partial^2 f_2(\lambda^k)}{\partial \lambda_{1,1} \partial \lambda_{1,L_R}} & L & \frac{\partial^2 f_2(\lambda^k)}{\partial \lambda_{1,L_R}^2} & \frac{\partial^2 f_2(\lambda^k)}{\partial \lambda_{2,1} \partial \lambda_{1,L_R}} & L & \frac{\partial^2 f_2(\lambda^k)}{\partial \lambda_{1,L_R} \partial \lambda_{2,L_R}} \\ \frac{\partial^2 f_2(\lambda^k)}{\partial \lambda_{1,1} \partial \lambda_{2,1}} & L & \frac{\partial^2 f_2(\lambda^k)}{\partial \lambda_{2,1} \partial \lambda_{1,L_R}} & \frac{\partial^2 f_2(\lambda^k)}{\partial \lambda_{2,1}^2} & L & \frac{\partial^2 f_2(\lambda^k)}{\partial \lambda_{2,1} \partial \lambda_{2,L_R}} \\ M & O & M & M & O & M \\ \frac{\partial^2 f_2(\lambda^k)}{\partial \lambda_{1,1} \partial \lambda_{2,L_R}} & L & \frac{\partial^2 f_2(\lambda^k)}{\partial \lambda_{1,L_R} \partial \lambda_{2,L_R}} & \frac{\partial^2 f_2(\lambda^k)}{\partial \lambda_{2,1} \partial \lambda_{2,L_R}} & L & \frac{\partial^2 f_2(\lambda^k)}{\partial \lambda_{2,L_R}^2} \end{pmatrix},$$

and $\nabla f_2(\lambda^k) = \left( \frac{\partial f_2(\lambda^k)}{\partial \lambda_{1,1}} \quad L \quad \frac{\partial f_2(\lambda^k)}{\partial \lambda_{1,L_R}} \quad \frac{\partial f_2(\lambda^k)}{\partial \lambda_{2,1}} \quad L \quad \frac{\partial f_2(\lambda^k)}{\partial \lambda_{2,L_R}} \right)^T$, $\frac{\partial f_2(\lambda)}{\partial \lambda_{1,j}} =$ $$\begin{cases} \sum_{i=1}^{M} |t_{ij}|^2 (-m_{1,i} + m_{2,i}) - c_{a,j} m_{3,j} + m_{4,j}, & 1 \le j \le M \\ \sum_{i=1}^{M} |t_{ij}|^2 (-m_{1,i} + m_{2,i}), & M+1 \le j \le L_R \end{cases},$$

$\frac{\partial f_2(\lambda)}{\partial \lambda_{2,j}} = \begin{cases} -c_{b,j} m_{1,j} + m_{2,j} + \sum_{i=1}^{M} |t_{ji}|^2 (-m_{3,i} + m_{4,i}), & 1 \le j \le M \\ \sum_{i=1}^{M} |t_{ji}|^2 (-m_{3,i} + m_{4,i}), & M+1 \le j \le L_R \end{cases}$, $\frac{\partial^2 f_2(\lambda)}{\partial \lambda_{1,j}^2} =$ $\begin{cases} \sum_{i=1}^{M} |t_{ij}|^2 (m_{1,i}^2 - m_{2,j}^2) + c_{a,j}^2 m_{3,j}^2 - m_{4,j}^2, & 1 \le j \le M \\ \sum_{i=1}^{M} |t_{ij}|^2 (m_{1,i}^2 - m_{2,i}^2), & M+1 \le j \le L_R \end{cases}$, $\frac{\partial^2 f_2(\lambda)}{\partial \lambda_{1,j} \partial \lambda_{1,l}} = \sum_{i=1}^{M} |t_{ij}|^2 |t_{il}|^2 (m_{1,i}^2 - m_{2,i}^2)$, $1 \le j, l \le L_R, j \ne l$, $\frac{\partial^2 f_2(\lambda)}{\partial \lambda_{2,j}^2} = \begin{cases} c_{b,j}^2 m_{1,j}^2 - m_{2,j}^2 + \sum_{i=1}^{M} |t_{ji}|^4 (m_{3,i}^2 - m_{4,i}^2), & 1 \le j \le M \\ \sum_{i=1}^{M} |t_{ji}|^4 (m_{3,i}^2 - m_{4,i}^2), & M+1 \le j \le L_R \end{cases}$, $\frac{\partial^2 f_2(\lambda)}{\partial \lambda_{2,j} \partial \lambda_{2,l}} = \sum_{i=1}^{M} |t_{ji}|^2 |t_{li}|^2 (m_{3,i}^2 - m_{4,i}^2)$, $1 \le j, l \le L_R$, $\frac{\partial^2 f_2(\lambda)}{\partial \lambda_{1,j} \partial \lambda_{2,l}} = \begin{cases} |t_{lj}|^2 (c_{b,i} m_{1,i}^2 - m_{2,i}^2 + c_{a,i} m_{3,i}^2 - m_{4,i}^2), & 1 \le j, l \le M \\ |t_{lj}|^2 (c_{a,i} m_{3,i}^2 - m_{4,i}^2), & 1 \le j \le M, M+1 \le l \le L_R \\ |t_{lj}|^2 (c_{b,i} m_{1,i}^2 - m_{2,i}^2), & M+1 \le j \le N_R, 1 \le l \le M \\ 0, & M+1 \le j, l \le L_R \end{cases}$, -continued $$m_{1,i} = \frac{\lambda_{1R,i}}{1 + \sum_{k=1}^{L_R} \lambda_{1,k}|t_{ik}|^2 \lambda_{1R,i} + \lambda_{2,i} c_{b,i} \lambda_{1R,i}}, m_{2,i} = \frac{\lambda_{1R,i}}{1 + \sum_{k=1}^{L_R} \lambda_{1,k}|t_{ik}|^2 \lambda_{1R,i} + \lambda_{2,i} \lambda_{1R,i}},$$

$$m_{3,i} = \frac{\lambda_{2R,i}}{1 + \lambda_1 c_{a,i} \lambda_{2R,i} + \sum_{k=1}^{L_R} \lambda_{2,k}|t_{ki}|^2 \lambda_{2R,i}}, m_{4,i} = \frac{\lambda_{2R,i}}{1 + \lambda_1 \lambda_{2R,i} + \sum_{k=1}^{L_R} \lambda_{2,k}|t_{ki}|^2 \lambda_{2R,i}}.$$

Denote $$M_1 = H_{R2}\left[I_{L_2} + H_{12}^H\left(I_{L_1} + \frac{P_2}{L_2 \sigma_n^2} H_{12} H_{12}^H\right)^{-1} \frac{P_2}{L_2 \sigma_n^2} H_{12}\right] H_{R2}^H,$$

and $M_2 = H_{R1}\left[I_{L_1} + H_{21}^H\left(I_{L_2} + \frac{P_1}{L_1 \sigma_n^2} H_{21} H_{21}^H\right)^{-1} \frac{P_1}{L_1 \sigma_n^2} H_{21}\right] H_{R1}^H.$ They are both Hermitian, and $M_1 = U_{M_1} \Lambda_{M_1} U_{M_1}^H$, and $M_2 = U_{M_2} \Lambda_{M_2} U_{M_2}^H$, with $U_{M_1}, U_{M_2} \in C^{L_R \times L_R}$ are unitary matrices, and $\Lambda_{M_1} = \text{diag}\{\lambda_{M_1,i}\}$ and $\Lambda_{M_2} = \text{diag}\{\lambda_{M_2,i}\}$ are diagonal matrices.

Let $W_1 = V_{2R} \tilde{W}_1 U_{M_2}^H$ and $W_2 = V_{1R} \tilde{W}_2 U_{M_1}^H$, The problem to determine $\tilde{W}_1, \tilde{W}_2 \in C^{L_R \times L_R}$, when the CSI of the direct links between Node$_1$ and Node$_2$ is available, the RN is the same form as above when the CSI for the direct links between Node$_1$ and Node$_2$ is not available and the iterative approach of finding the solution is almost the same as the three cases above by just replacing $\lambda_{R2,i}$ and $\lambda_{R1,i}$ by $\lambda_{M_1,i}$ and $\lambda_{M_2,i}$, respectively.

In the design problem, both nodes (source and destination) send out (transmit, communicate, forward) training sequences to the RN, so that the RN can estimate the incoming channels. The RN also needs to send out (transmit, communicate, forward) training sequence(s) for the nodes (source and destination) to estimate the channels (links) from the RN to each of them and also transmit (send out, forward, communicate) information regarding the pre-coding matrices the RN uses.

Figure 4A:
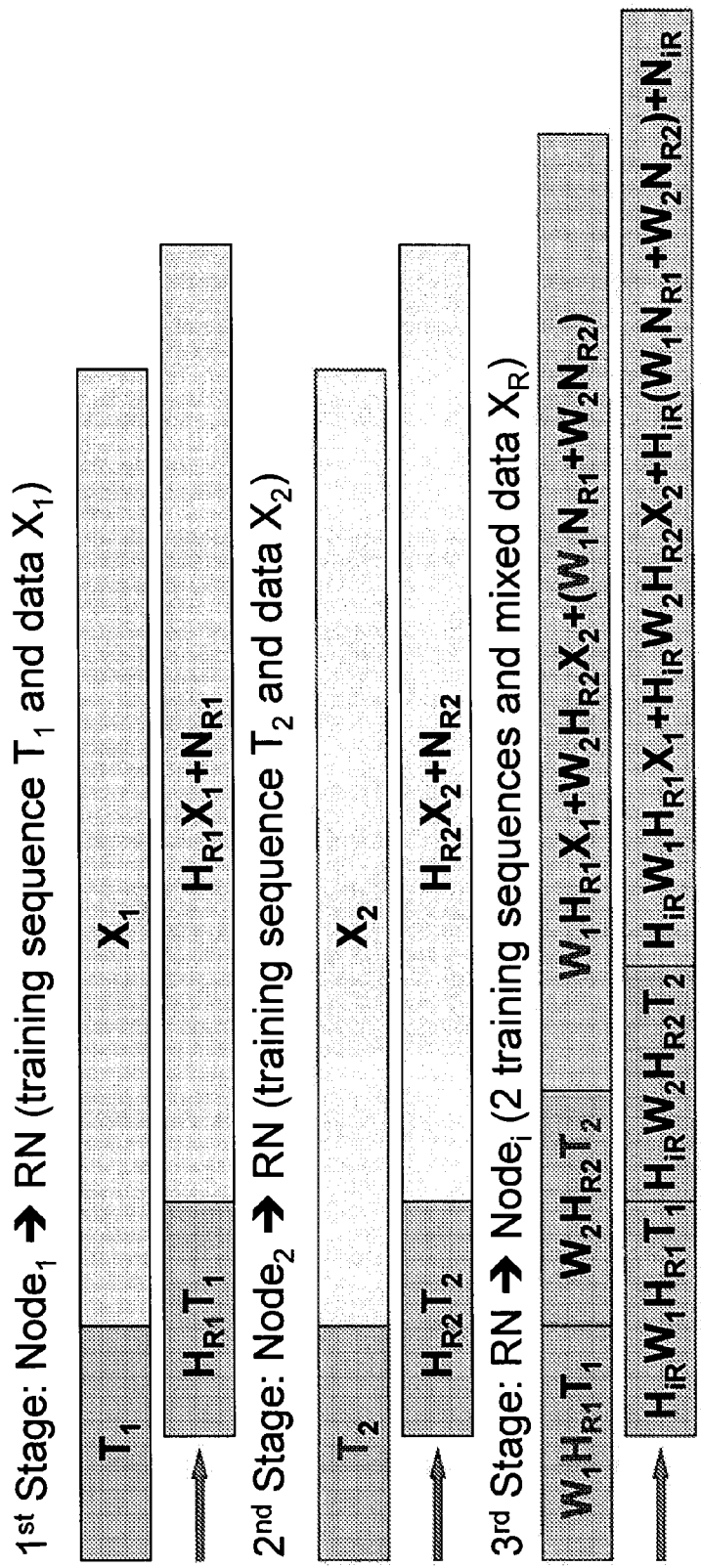
FIG. 4 is collectively simplified exemplary frame structures for the Network-Coded Amplify-and-Forward relaying scheme without beamforming at source nodes of the present invention.
Figure 5A:
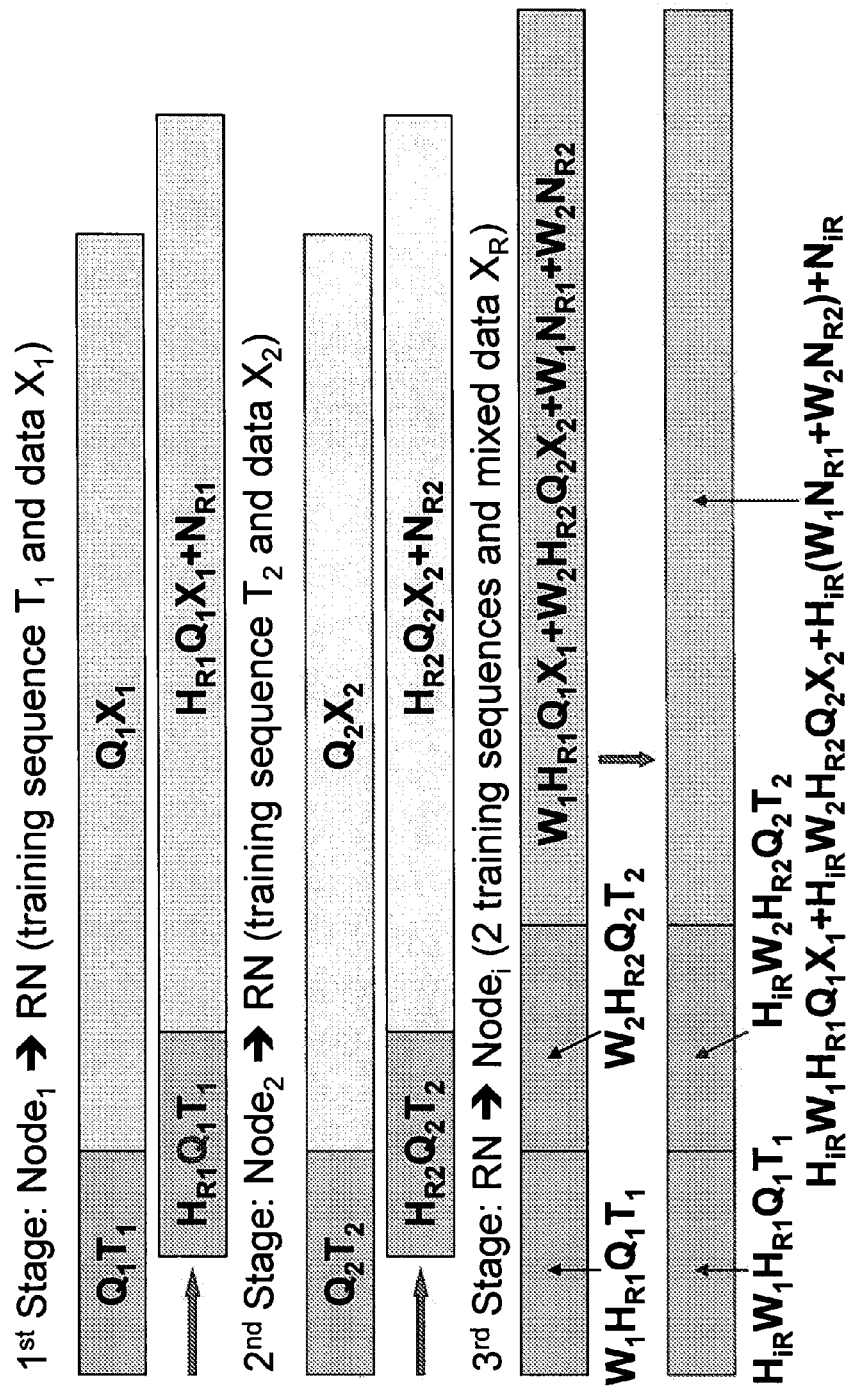
FIG. 5 is collectively simplified exemplary frame structures for the Network-Coded Amplify-and-Forward relaying scheme with beamforming at source nodes of the present invention.

Two basic data frame structures are proposed for use in the present invention:

(1) The RN applies the pre-coding matrices to the training sequences it receives and forwards them, as in FIG. 4(a) and FIG. 5(a).

(2) The RN estimates the incoming channel matrices, multiplies them with the pre-coding matrices, quantizes the resulting matrices, and feeds them back. It also sends out its own training sequence to the nodes (source and destination) to estimate the channel state (channel conditions) from the RN to them, as in FIG. 4(b) and FIG. 5(b). Still there are other channel estimations that need to be done, such as the CSI of the outgoing channels from RN to nodes (source and destination) at the RN and the CSI of the direct links at the RN. They are done by other frames, such as control frames, etc.

Referring again to FIG. 3a, which is a block diagram of the operation of an exemplary embodiment of the transmission side of the Network-Coded Amplify-and-Forward relaying scheme of the present invention. Data $S_1$ is transmitted (communicated) from Node$_1$ as signal $X_1$ to the RN in the first time slot and data $S_2$ is transmitted (communicated) from Node$_2$ as signal $X_2$ to the RN in the second time slot. The RN then pre-codes, mixes (combines) and multicasts (broadcasts) the pre-coded mixed data ($X_R$) for receipt by both Node$_1$ and Node$_2$. It goes without saying that the pre-coded mixed (combined) data is modulated.

Figure 3B:
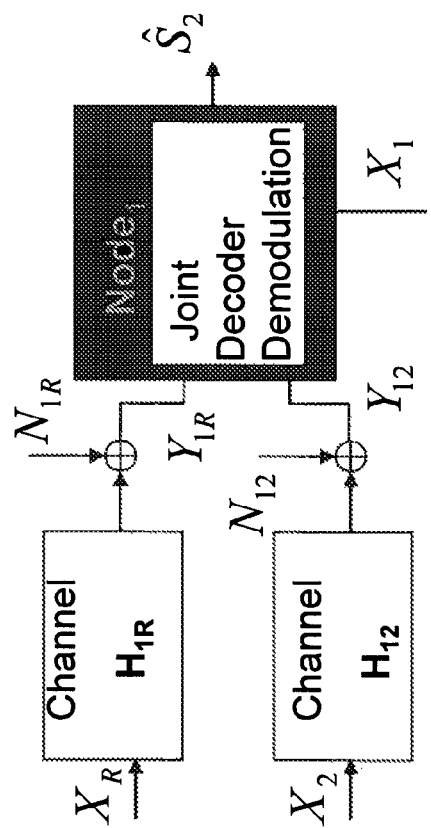
FIG. 3b is a block diagram of the operation of an exemplary embodiment of the reception side of the Network-Coded Amplify-and-Forward relaying scheme of the present invention from the perspective of Node$_1$.

Referring again to FIG. 3b, which is a block diagram of the operation of an exemplary embodiment of the reception side of the Network-Coded Amplify-and-Forward relaying scheme of the present invention from the perspective of Node$_1$. Node$_1$ receives signal $Y_{12}$ from Node$_2$ and signal $Y_{1R}$ from the RN and performs joint network and channel decoding. It goes without saying that the decoded data is demodulated.

Figure 3C:
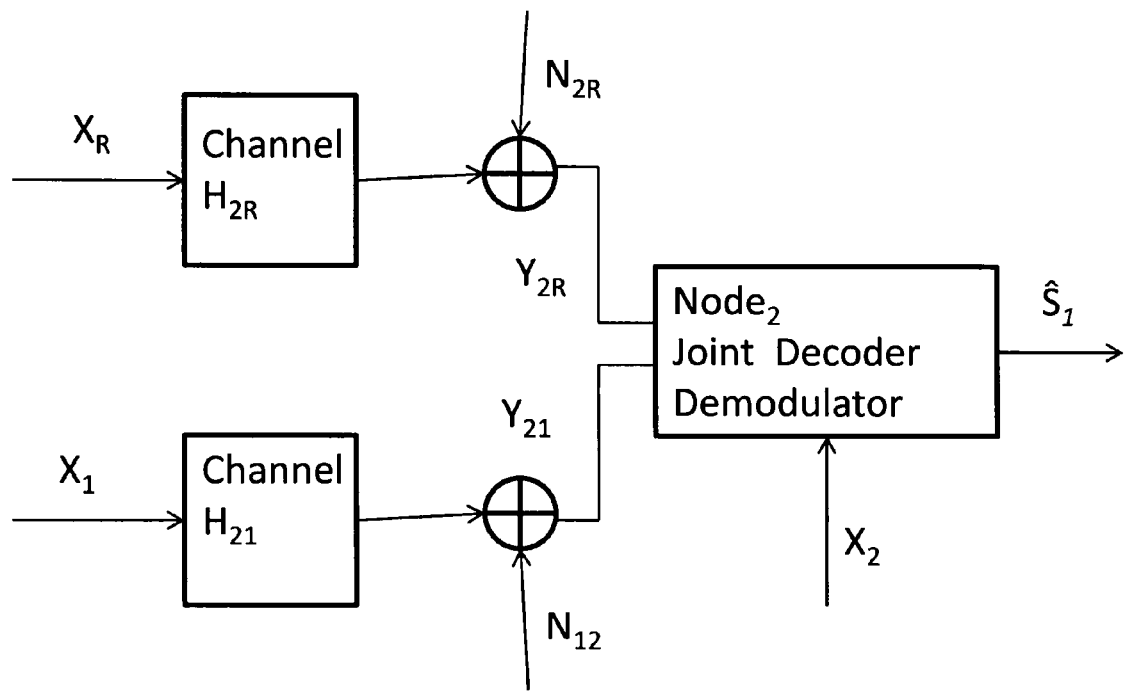
FIG. 3c is a block diagram of the operation of an exemplary embodiment of the reception side of the Network-Coded Amplify-and-Forward relaying scheme of the present invention from the perspective of Node$_2$.

Referring again to FIG. 3c, which is a block diagram of the operation of an exemplary embodiment of the reception side of the Network-Coded Amplify-and-Forward relaying scheme of the present invention from the perspective of Node$_2$. Node$_2$ receives signal $Y_{21}$ from Node$_1$ and signal $Y_{2R}$ from the RN and performs joint network and channel decoding. It goes without saying that the decoded data is demodulated.

That is, from the standpoint (perspective) of a node that holds (possesses) the transmission opportunity (TXOP), the node includes means for transmitting (sending out, communicating) a first signal having data and means for receiving a second signal. The transmitting and receiving means may be a transceiver or a separate transmitter and a separate receiver or any equivalent means. The node also has means for jointly decoding the second signal by removing (substracting off) a training sequence and the first signal. Optionally, the node also includes means for decoding the second signal by accounting for the application of a first beamforming matrix to the data of the first signal and the application of a second beamforming matrix to the data of the second signal.

From the standpoint (perspective) of a relay node (RN), the RN includes means for receiving a first signal in a first time slot of a first channel, means for receiving a second signal in a second time slot of a second channel, means for determining a first pre-coding matrix, means for determining a second pre-coding matrix, wherein the first pre-coding matrix and the second pre-coding matrix maximize a joint channel capacity of the first channel and second channel respectively, means for applying the first pre-coding matrix to first data, means for applying the second pre-coding matrix to second data, means for generating a third signal by mixing (combining) the pre-coded first data and the pre-coded second data and means for transmitting the third signal. The transmitting and receiving means may be a transceiver or a separate transmitter and a separate receiver or any equivalent means. The RN also includes means for generating a first estimated channel matrix for the first channel and a second estimated channel matrix for the second channel, means for inserting the first pre-coding matrix times the first estimated channel matrix and the second pre-coding matrix times the second estimated channel matrix between a training sequence of the third signal and means for quantizing the first pre-coding matrix times the first estimated channel matrix and means for quantizing the second pre-coding matrix times the second estimated channel matrix before the means for inserting is executed. Optionally, the RN also includes means for determining a first beamforming matrix, means for determining a second beamforming matrix and means for applying the first beamforming matrix to the first data and applying the second beamforming matrix to the second data before generating the third signal. The RN also optionally includes means for applying the first beamforming matrix to the first pre-coded matrix times the first estimated channel matrix and means for applying the second beamforming matrix to the second pre-coded matrix times the second estimated channel matrix before inserting the first pre-coded matrix times the first estimated channel matrix and the second pre-coded matrix times the second estimated channel matrix between the training sequence of the third signal.

Referring again to FIG. 4, which is collectively simplified exemplary frame structures for the Network-Coded Amplify-and-Forward relaying scheme without beamforming at source nodes of the present invention. FIG. 4a shows the case where training sequences are sent from the source nodes. The RN sends out training sequences but the training sequences sent by the RN are effectively the training sequences that the RN received from $Node_1$ and $Node_2$ copied and returned to the source nodes ($Node_1$ and $Node_2$). In the third stage the RN transmits the two training sequences and the mixed data $X_R$ to $Node_i$. Pre-coding matrices are applied to both the training sequences and to the mixed data $X_R$. Pre-coding matrix $W_1$ is applied to $T_1$ (the first training sequence) and pre-coding matrix $W_2$ is applied to $T_2$ (the second training sequence). Pre-coding matrix $W_1$ is also applied to $H_{R1}X_1$ of the mixed signal $X_R$ and $W_2$ is applied to $H_{R2}X_2$ of the mixed signal $X_R$. Note that $H_{R1}X_1$ is the desired signal that the RN received from $Node_1$ ($Node_1$ sent $X_1$). Also note that $H_{R2}X_2$ is the desired signal that the RN received from $Node_2$ ($Node_2$ sent $X_2$). In FIG. 4b, each node sends out (transmits, communicates) its own training sequence and the RN also sends out (transmits, communicates) pre-coding matrices $W_1$ and $W_2$ in addition to the mixed data $X_R$. No pre-coding matrix is applied to the training sequence $T_R$ sent out (transmitted, communicated) by the RN.

Referring again to FIG. 5, which is collectively simplified exemplary frame structures for the Network-Coded Amplify-and-Forward relaying scheme with beamforming at source nodes of the present invention. FIG. 5a shows the case where training sequences are sent from the source nodes. The RN sends out training sequences but the training sequences sent by the RN are effectively the training sequences that the RN received from $Node_1$ and $Node_2$ copied and returned to the source nodes ($Node_1$ and $Node_2$). In the third stage the RN transmits the two training sequences and the mixed data $X_R$ to $Node_i$. Pre-coding matrices are applied to both the training sequences and to the mixed data $X_R$. Pre-coding matrix $W_1$ is applied to $T_1$ (the first training sequence) and pre-coding matrix $W_2$ is applied to $T_2$ (the second training sequence). Pre-coding matrix $W_1$ is also applied to $H_{R1}X_1$ of the mixed signal $X_R$ and W2 is applied to $H_{R2}X_2$ of the mixed signal $X_R$. Note that $H_{R1}X_1$ is the desired signal that the RN received from $Node_1$ ($Node_1$ sent $X_1$). Also note that $H_{R2}X_2$ is the desired signal that the RN received from $Node_2$ ($Node_2$ sent $X_2$). In addition to applying the pre-coding matrices to the training sequences and the mixed data, beamforming matrix $Q_1$ is applied to training sequence $T_1$ and beamforming matrix $Q_2$ is applied to training sequence $T_2$. Beamforming matrix $Q_1$ is also applied to $X_1$ of the mixed signal $X_R$ and beamforming matrix $Q_2$ is applied to $X_2$ of mixed signal $X_R$. In FIG. 5b, each node sends out (transmits, communicates) its own training sequence and the RN also sends out (transmits, communicates) pre-coding matrices $W_1$ and $W_2$ in addition to the mixed signal $X_R$. No pre-coding matrix is applied to the training sequence TR sent out (transmitted, communicated) by the RN. Pre-coding matrices are applied to the mixed signal $X_R$. Pre-coding matrix $W_1$ is also applied to $H_{R1}X_1$ of the mixed signal $X_R$ and W2 is applied to $H_{R2}X_2$ of the mixed signal $X_R$. Note that $H_{R1}X_1$ is the desired signal that the RN received from $Node_1$ ($Node_1$ sent $X_1$). Also note that $H_{R2}X_2$ is the desired signal that the RN received from $Node_2$ ($Node_2$ sent $X_2$). In addition to applying the pre-coding matrices to mixed signal, beamforming matrix $Q_1$ is also applied to $X_1$ of the mixed signal $X_R$ and beamforming matrix Q2 is applied to $X_2$ of mixed signal $X_R$.

Figure 6:
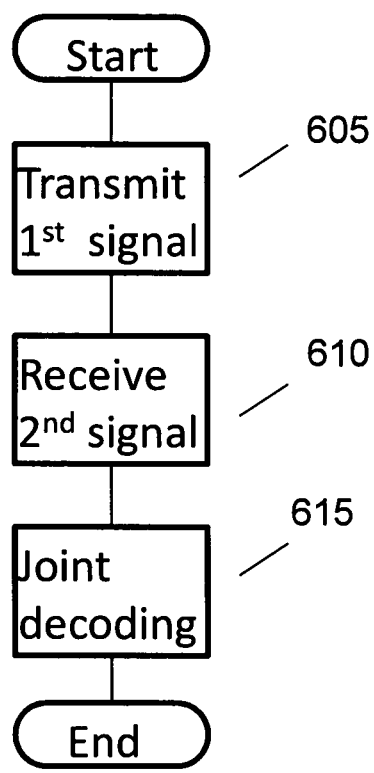
FIG. 6 is a flowchart of an exemplary embodiment of the present invention from the perspective of a node (source and destination).

Referring to FIG. 6, which is a flowchart of an exemplary embodiment of the present invention from the perspective of a node (source and destination), at 605 the node transmits a first signal (message) including data. At 610, the node receives a second signal (message) including data. At 615, the node jointly decodes the second signal (message) which was a combined signal (message) including both the first data transmitted by the node and third data transmitted by another node (destination node for the first data and source node for the third data) by removing (subtracting out) the first data and the training sequence since both the training sequence and the first data are known as well as the pre-coding matrix that was applied to the first data.

Figure 7:
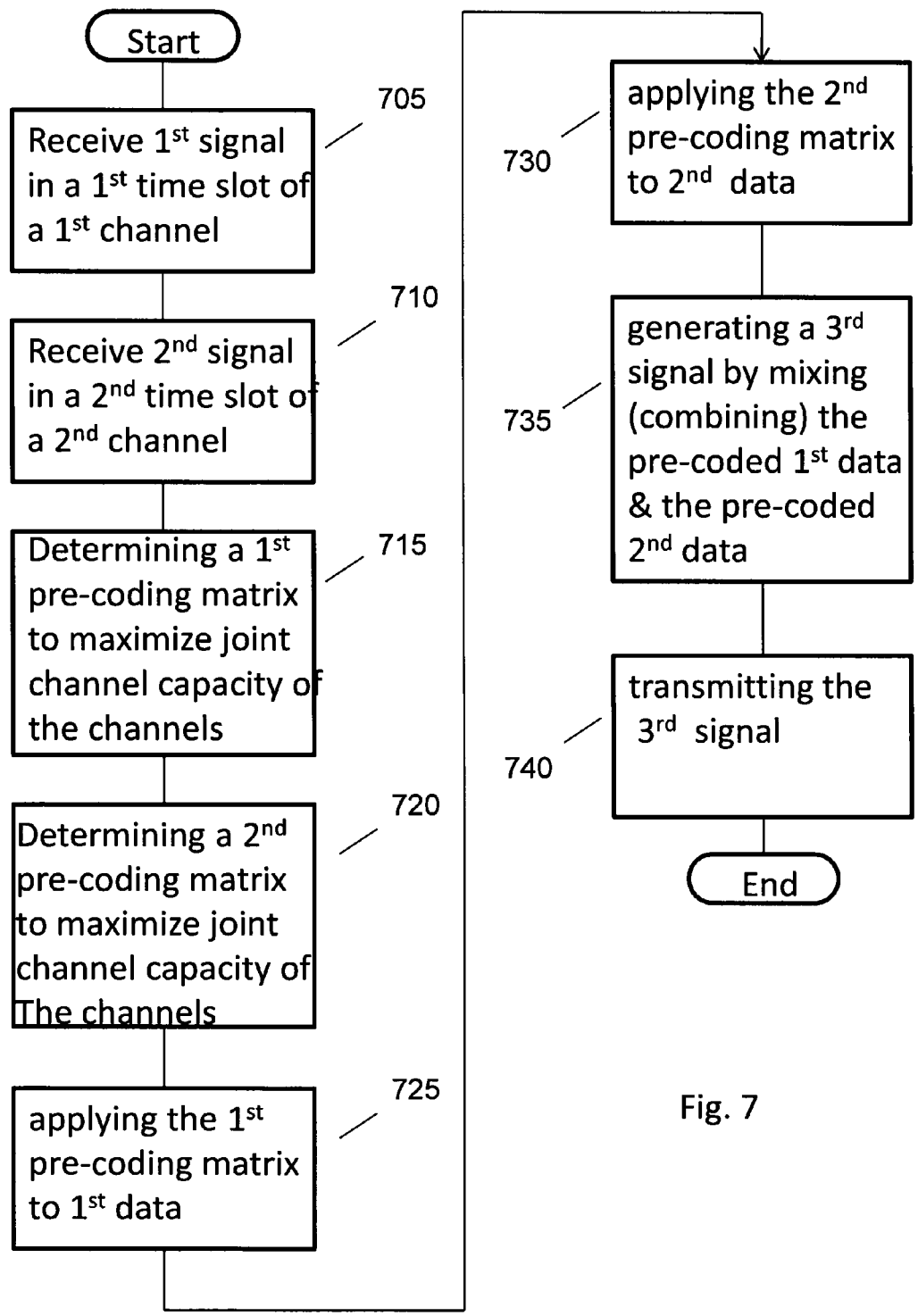
FIG. 7 is a flowchart of an exemplary embodiment of the present invention from the perspective of a relay node.

Referring to FIG. 7, which is a flowchart of an exemplary embodiment of the present invention from the perspective of a relay node, at 705 the relay node receives a first signal (message) in a first time slot of a first channel. The first signal includes first data and a first training sequence. At 710 the relay node receives a second signal (message) in a second time slot of a second channel. The second signal includes second data and a second training sequence. At 715 the relay node determines a first pre-coding matrix to maximize the joint capacity of the channels. At 720 the relay node determines a second pre-coding matrix to maximize the joint capacity of the channels. At 725 the relay node applies the first pre-coding matrix to first data. At 730 the relay node applies the second pre-coding matrix to second data. At 735 the relay node generates a third signal by mixing (combining) the pre-coded first data and the pre-coded second data. At 740 the relay node transmits (multicasts, broadcasts, communicates, sends out) the third data over (on) both the first and the second channels.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for operation of a bi-directional communication system making use of a relay node, said method comprising:
receiving, by said relay node, a first signal including first data in a first time slot of a first channel;
receiving, by said relay node, a second signal including second data in a second time slot of a second channel, wherein said first signal and said second signal are exchanged between a source node and a destination node communicating with each other via said relay node;
determining, by said relay node, a first pre-coding matrix to maximize a joint channel capacity of the first channel;
determining, by said relay node, a second pre-coding matrix to maximize a joint channel capacity of the second channel;
applying, by said relay node, said first pre-coding matrix to said first data to produce pre-coded first data, wherein said applying is accomplished by matrix multiplication;
applying, by said relay node, said second pre-coding matrix to said second data to produce pre-coded second data, wherein said applying is accomplished by matrix multiplication;
generating, by said relay node, a third signal by combining said pre-coded first data and said pre-coded second data, wherein said combining is accomplished by matrix addition; and
multicasting, by said relay node, said third signal on said first channel and said second channel.

2. The method according to claim 1, wherein said third signal further comprises a training sequence prepended to said third signal.

3. The method according to claim 2, further comprising generating, by said relay node, a first estimated channel matrix for said first channel and a second estimated channel matrix for said second channel.

4. The method according to claim 3, further comprising inserting, by said relay node, said first pre-coding matrix times said first estimated channel matrix and said second pre-coding matrix times said second estimated channel matrix between said training sequence of said third signal.

5. The method according to claim 4, further comprising quantizing, by said relay node, said first pre-coding matrix times said first estimated channel matrix and quantizing said second pre-coding matrix times said second estimated channel matrix before said insertion.

6. The method according to claim 2, wherein said training sequence includes a first training sequence and a second training sequence, said first training sequence is for said first channel and said second training sequence is for said second channel.

7. The method according to claim 1, wherein said first signal includes a training sequence and data.

8. The method according to claim 5, wherein said second signal includes a training sequence and data.

9. The method according to claim 1, further comprising:
determining, by said relay node, a first beamforming matrix;
determining, by said relay node, a second beamforming matrix; and
applying, by said relay node, said first beamforming matrix to said first data and applying said second beamforming matrix to said second data before generating said third signal.

10. The method according to claim 9, further comprising applying, by said relay node, said first beamforming matrix to said first pre-coded matrix times said first estimated channel matrix and applying said second beamforming matrix to said second pre-coded matrix times said second estimated channel matrix before inserting said first pre-coded matrix times said first estimated channel matrix and said second pre-coded matrix times said second estimated channel matrix between said training sequence of said third signal.

11. The method according to claim 1, wherein said first channel and said second channel are orthogonal.

12. The method according to claim 1, wherein said second time slot is a reverse direction granted by a node which used said first time slot.

13. An apparatus comprising:
means for receiving a first signal including first data in a first time slot of a first channel;
means for receiving a second signal including second data in a second time slot of a second channel, wherein said first signal and said second signal are exchanged between a source node and a destination node communicating with each other via said relay node;
means for determining a first pre-coding matrix to maximize a joint channel capacity of the first channel;
means for determining a second pre-coding matrix to maximize a joint channel capacity of the second channel;
means for applying said first pre-coding matrix to said first data to produce pre-coded first data, wherein said applying is accomplished by matrix multiplication;
means for applying said second pre-coding matrix to said second data to produce second pre-coded data, wherein said applying is accomplished by matrix multiplication;
means for generating a third signal by combining said pre-coded first data and said pre-coded second data, wherein said combining is accomplished by matrix addition; and
means for multicasting said third signal of said first channel and on said second channel, wherein said apparatus is a relay node of a bi-directional communications system.

14. The apparatus according to claim 13, wherein said third signal further comprises a training sequence prepended to said third signal.

15. The apparatus according to claim 14, further comprising means for generating a first estimated channel matrix for said first channel and a second estimated channel matrix for said second channel.

16. The apparatus according to claim 15, further comprising means for inserting said first pre-coding matrix times said first estimated channel matrix and said second pre-coding matrix times said second estimated channel matrix between said training sequence of said third signal.

17. The apparatus according to claim 16, further comprising means for quantizing said first pre-coding matrix times said first estimated channel matrix and means for quantizing said second pre-coding matrix times said second estimated channel matrix before said means for inserting is executed.

18. The apparatus according to claim 14, wherein said training sequence includes a first training sequence and a second training sequence, said first training sequence is for said first channel and said second training sequence is for said second channel.

19. The apparatus according to claim 13, wherein said first signal includes a training sequence and data.

20. The apparatus according to claim 13, wherein said second signal includes a training sequence and data.

21. The apparatus according to claim 13, further comprising:
   means for determining a first beamforming matrix;
   means for determining a second beamforming matrix; and
   means for applying said first beamforming matrix to said first data and applying said second beamforming matrix to said second data before generating said third signal.

22. The apparatus according to claim 21, further comprising means for applying said first beamforming matrix to said first pre-coded matrix times said first estimated channel matrix and means for applying said second beamforming matrix to said second pre-coded matrix times said second estimated channel matrix before inserting said first pre-coded matrix times said first estimated channel matrix and said second pre-coded matrix times said second estimated channel matrix between said training sequence of said third signal.

23. The apparatus according to claim 13, wherein said first channel and said second channel are orthogonal.

24. The apparatus according to claim 13, wherein said second time slot is a reverse direction granted by a node which used said first time slot.

* * * * *